Oct. 23, 1956

H. C. PORTER 2,768,317

DAMPER WINDING FOR D.C. MOTOR

Filed Feb. 19, 1954

INVENTOR.
Herbert C. Porter
BY
George H. Strickland
His Attorney

United States Patent Office 2,768,317
Patented Oct. 23, 1956

2,768,317

DAMPER WINDING FOR D. C. MOTOR

Herbert C. Porter, Rochester, N. Y., assignor to General Motors Corporation, Detroit, Mich., a corporation of Delaware Application February 19, 1954, Serial No. 411,465

2 Claims. (Cl. 310—183)

This invention pertains to electric motors, and particularly to direct current, series electric motors.

In certain types of direct current motor applications, such as vehicle window lift actuators, it is necessary to obtain zero torque at relatively low speeds without affecting the stall torque of the motor. This invention relates to an armature construction for accomplishing this result. Accordingly, among my objects are the provision of an armature construction for a series wound electric motor, which modifies the normal performance curve thereof; and the further provision of an armature construction for a series electric motor including short-circuited turns which do not affect the stall torque of the motor.

The aforementioned and other objects are accomplished in the present invention by opposing the armature winding current by an induced, or self-generated, current which modifies the normal performance curve of the series motor. Specifically, the preferred armature construction embodies a pair of windings, which are located nearer to the periphery of the armature core than the armature windings. The ends of each winding are electrically connected together adjacent the rear of the armature. Thus, the windings form short-circuited loops in which a current is induced, or generated, during armature rotation. In this manner the normal starting, or stall, torque of the motor is not affected.

Further objects and advantages of the present invention will be apparent from the following description, reference being had to the accompanying drawing wherein a preferred embodiment of the present invention is clearly shown.

Figure 1:
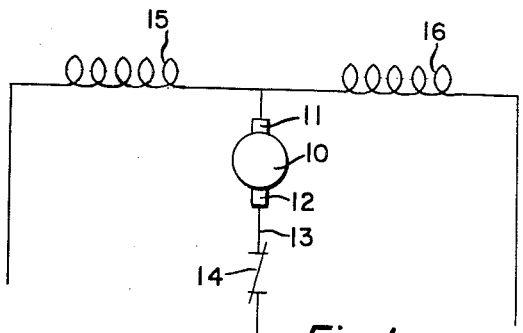
Fig. 1 is a wiring diagram for a reversible, split series type motor used in window lift applications.

With particular reference to Fig. 1, a circuit is shown including an armature 10 of a series wound, direct current motor. The armature 10 is formed with a commutator, not shown, which commutator is engaged by brushes 11 and 12. Brush 12 is electrically connected to a wire 13 and, thence, through a thermal overload switch 14 of conventional design to one terminal of a source of current, not shown. The other brush 11 is connected by branch conductors through series field windings 15 and 16 and, thence, through suitable switch means, not shown, to the other terminal of the source of current, not shown. As will be understood by those skilled in the art, energization of field winding 15 will result in rotation of the armature 10 in one direction, while energization of field winding 16 will result in rotation of the armature 10 in the opposite direction.

Figure 2:
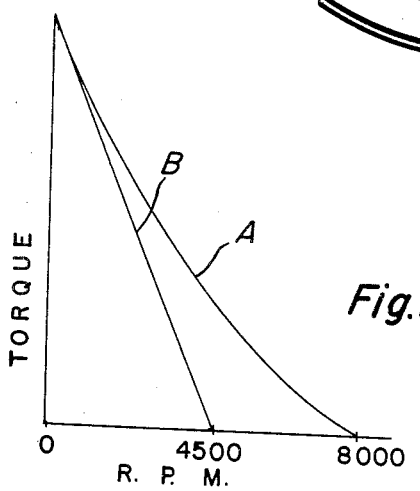
Fig. 2 is a graph depicting the normal and modified performance curves of a series motor.

With particular reference to Fig. 2, a graph is depicted in which the abscissa represents speed and the ordinate represents torque. The normal speed torque, or performance curve, of a series wound electric motor is depicted by the curve A, from which it may be seen that at the zero speed, the torque is a maximum, and as the speed increases, the torque decreases until at a predetermined speed, dependent upon the construction of the electric motor, the torque will approach zero. In the specific motor under consideration, the normal performance curve approaches zero torque at approximately 8000 R. P. M. However, in designing an electric motor for operating vehicle window lifts, it became necessary to modify the normal performance curve so as to obtain zero torque at a greatly reduced speed of approximately 4,500 R. P. M. In order to accomplish this objective, without affecting the stall torque of the electric motor, short-circuited loops were wound on the armature. The modified performance curve is indicated by the letter B in Fig. 2.

Figure 3:
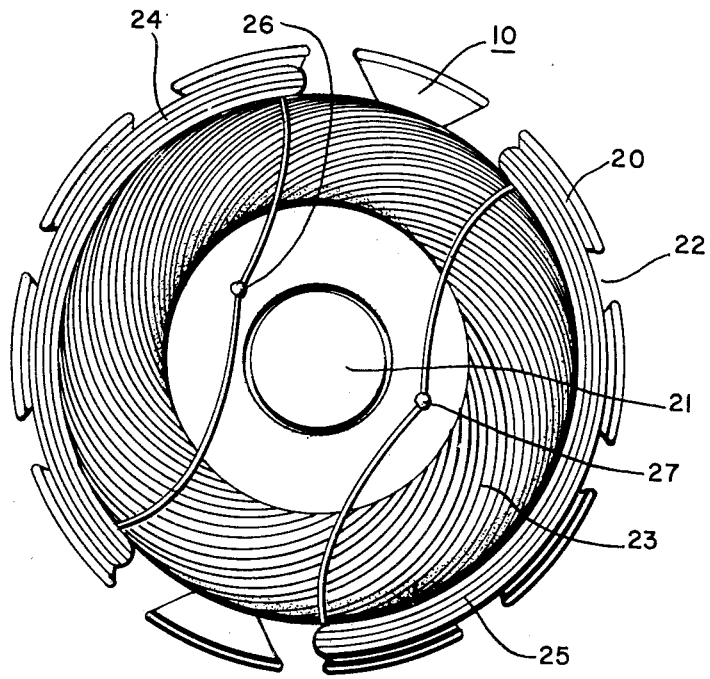
Fig. 3 is an end view, in elevation, of an armature constructed according to this invention.

With particular reference to Fig. 3, the armature 10 comprises a core 20, preferably composed of laminations, which is mounted on a shaft 21. The laminated core 20 is formed with a plurality of axially extending, open slots 22 in which armature windings 23 are wound. The slots define a plurality of spaced core teeth, as shown in Fig. 3. In a conventional manner, the armature windings are insulated from the core 20 by any suitable means, not shown.

The armature core 20 also has wound therearound a pair of windings 24 and 25, which are located diametrically opposite on the core 20, and nearer the core periphery than the windings 23. The windings 24 and 25 have a tooth span equal to that of the coils constituting the armature windings 23, and, as seen in Fig. 3, each of the short-circuited windings 24 and 25 span four teeth. The ends of coil 24 are electrically connected at 26, and the ends of coil 25 are electrically connected at 27. Thus, each coil forms a short circuited loop. Moreover, although the two coils are shown being diametrically opposed, this is only exemplary, as the short-circuited coils may be distributed in other ways on the armature to reduce torque pulsations and noise.

When the armature is not rotating, or, in other words, is stalled, with the field and armature windings energized, no current is generated in the shorted windings 24 and 25. Accordingly, the normal stall torque of the series motor is not effected by the presence of the short-circuited windings 24 and 25. However, when the armature is rotating, a current is generated in the short-circuited loops, or windings, 24 and 25, and in this manner the normal speed torque curve A, in Fig. 2, can be modified and take the form of the curve B. In this manner, when the motor is under no load, the induced or self-generated currents in the short-circuited windings 24 and 25 will increase the armature losses, and thereby oppose the current in the armature windings 23 so as to materially reduce the no-load zero torque speed of the motor. The shorted windings also produce a field which opposes that of the armature coils, and thus absorb energy in relation to motor speed.

From the foregoing, it should be appreciated that by following the teachings of the present invention, the performance curve of a series wound electric motor can be modified so that the torque will drop to zero at any selected speed. In this manner, the application of series type electric motors for actuating devices which are subject to variable loads, may be greatly increased.

While the embodiment of the present invention as herein disclosed, constitutes a preferred form, it is to be understood that other forms might be adopted.

What is claimed is as follows:

1. An armature for a direct current series motor including in combination; a core having a plurality of axially extending slots which define a plurality of axially extending, circumferentially spaced core teeth; armature windings within all of the slots of said core; and a pair of short-circuited windings on said core for reducing the zero torque speed of said armature; each short-circuited winding having a predetermined number of turns determined by a selected optimum zero torque speed of said armature and encircling a predetermined number of said core teeth.

2. An armature for a direct current series motor including in combination; a core having a plurality of axially extending slots which define a plurality of axially extending, circumferentially spaced core teeth; armature windings within all of the slots of said core; and a plurality of short-circuited windings on said core for reducing the zero torque speed of said armature; each short-circuited winding encircling a predetermined number of said core teeth and comprising a predetermined number of turns determined by a selected optimum zero torque speed of said armature.

References Cited in the file of this patent

UNITED STATES PATENTS 1,621,937    Lee _____ Mar. 22, 1927